April 18, 1961     J. G. BAMBERGER     2,980,100
BARBECUE GRILLS
Filed Feb. 18, 1957
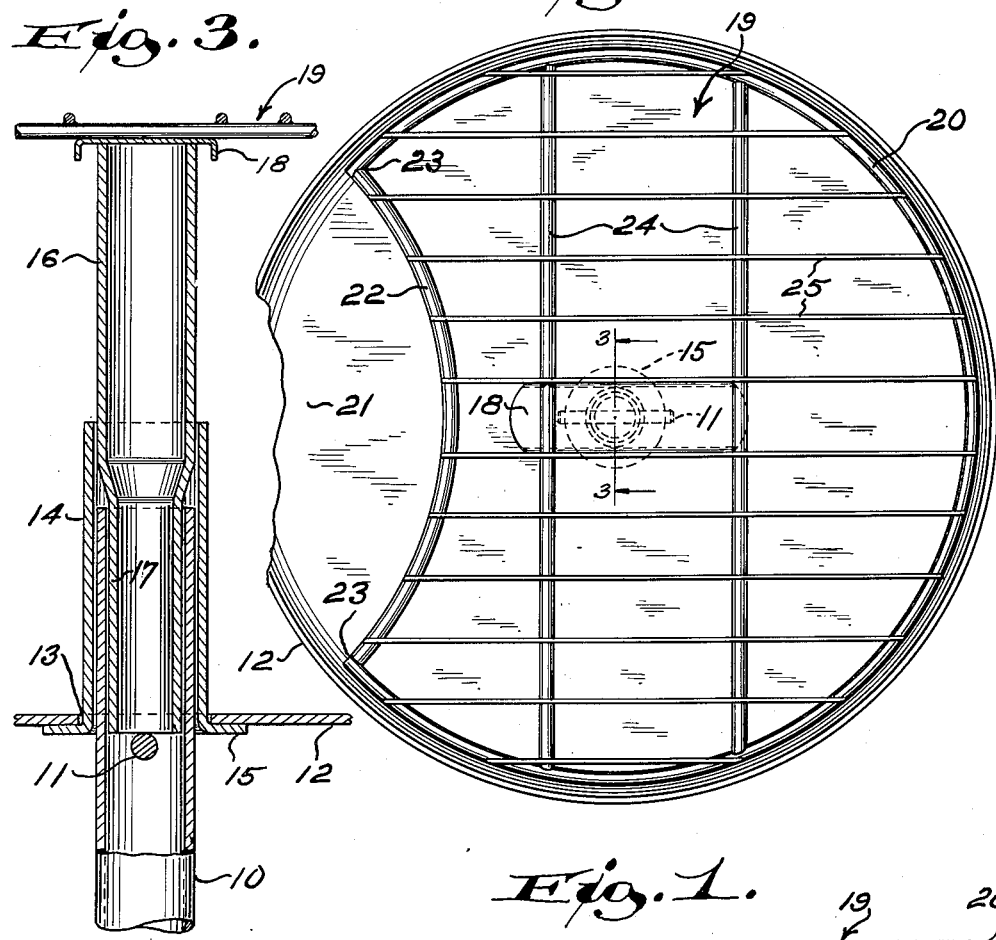
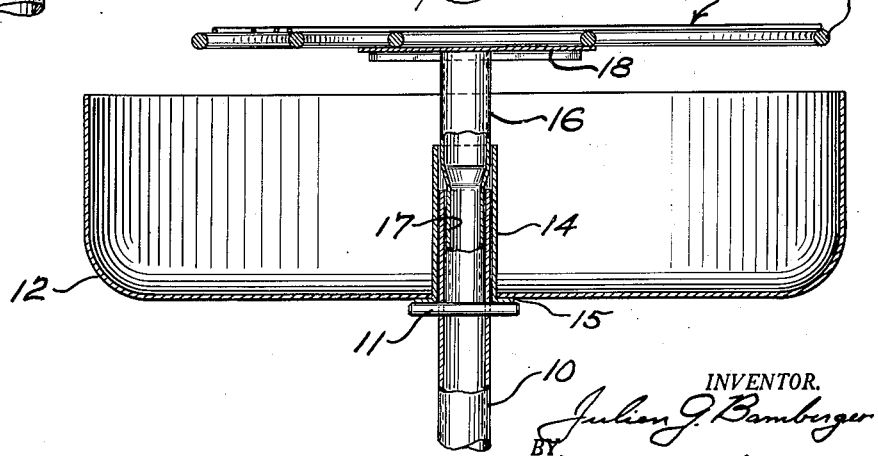
INVENTOR.
Julien G. Bamberger
BY
ATTORNEYS.

United States Patent Office 2,980,100
Patented Apr. 18, 1961

2,980,100

BARBECUE GRILLS

Julien G. Bamberger, Milwaukee, Wis., assignor to Masco Corporation, Milwaukee, Wis., a corporation of Wisconsin Filed Feb. 18, 1957, Ser. No. 640,736

1 Claim. (Cl. 126—25)

This invention relates to improvements in barbecue grills.

In the use of a conventional barbecue grill it is difficult to service the firepot while cooking is being done. It is also difficult to keep an even fire under all portions of the food.

It is a general object of the present invention to provide an improved barbecue grill wherein the firepot may be readily serviced while food is being cooked.

A further object of the invention is to provide an improved barbecue grill having means whereby the position of the fire bed with respect to food on the grill may be shifted to better distribute the heat, such as to change the hottest part of the fire to a different location with respect to the meat or other food.

A more specific object of the invention is to provide a barbecue grill having a grid portion with a peripheral recess, there being provision for relative rotation between the grill and firepot so as to facilitate servicing or to bring different portions of the fire bed into registration with the recess for better servicing.

A further object of the invention is to provide a barbecue grill in which the parts may be readily disassembled for transportation or storage.

Other objects of the invention are to provide a barbecue grill which is relatively simple in construction, neat in appearance, and otherwise well adapted for the purposes described.

In the accompanying drawings, illustrating one complete embodiment of the preferred form of the invention, in which the same reference numerals designate the same parts in all of the views:

Fig. 1 is a vertical sectional view through the improved barbecue grill, the lower portion of the standard and supporting base being broken away and omitted;

Fig. 2 is a top view of the structure of Fig. 1, part of the firepot being broken away; and Fig. 3 is a fragmentary vertical sectional view at right angles to Fig. 1, taken approximately on the line 3—3 of Fig. 2.

Referring more particularly to the drawing, the numeral 10 designates a tubular standard which may be supported in vertical position in any desired manner. Extending transversely through the standard a predetermined distance below its upper end, is a pin 11. A metal firepot 12 which is preferably circular in plan view has a central opening 13. A bearing sleeve 14 having an outwardly directed bottom flange 15 is inserted through the opening 13, as shown in Fig. 3, and the bottom of the firepot may be welded or otherwise secured to the annular flange 15. The firepot with the assembled sleeve 14 may be slipped over the upper end of the standard 10 and supported on the pin 11, as shown in Figs. 1 and 3, the pot being rotatable around the standard 10.

A tubular grid support 16 may have its lower portion 17 of decreased diameter to swivel within the upper end of the tubular standard 10, as shown in Figs. 1 and 3. Part of the support 16 which is of larger diameter projects into the upper end of the sleeve 14. The lower end of the support 16 rests on the transverse pin 11 and the support is rotatable within the upper end of the standard 10.

Suitably secured to the upper end of the grid support 16 is a bracket 18 which is welded or otherwise secured to the underside of a grid 19.

The grid includes a circular rim 20 having a peripheral portion, preferably about 90°, removed to create the recess 21. A concavely arched bar portion 22 has its ends connected as at 23 to the ends of the rim 20. The grid may include cross rods 24 and transversely extending grid members 25.

In use of the device the grid and its support 16 may be removed, if desired, while building the fire in the pot 12. After the fire has been started the grid support 16—17 may be slipped into the upper end of the standard 10 and sleeve 14, until it rests on the pin 11. The food may then be placed on the grid and cooked in the usual manner.

While the broader aspects of the invention contemplate the use of a cutout in a grid, with either the grid or firepot relatively movable, nevertheless the present invention discloses both the grid and firepot as rotatable. In case a portion of the fire needs servicing while the food is cooking, it is merely necessary to rotate either the grid or firepot until the part that needs servicing is in registration with the grid recess 21. Customarily, this will be done by rotating the firepot. It may also be desirable to rotate the firepot for the purpose of bringing hotter coals to a different location so as to increase the heat below certain portions of the food and decrease it below other portions. This last object may also be accomplished by rotating the grid relative to the firepot. The rotatable grid feature may also be handy when putting food on or removing it from the grid so as to make certain portions of the grid more accessible to the cook.

It is apparent from the above that a very simple form of grill has been provided which may be sold inexpensively, and which will ease the work of one preparing food on a grill and at the same time ensure better application of the heat to the food. The grill may be very easily disassembled for transportation or storage.

It is to be understood that the present invention is not to be limited to the exact details of construction shown or described, for obvious modificaions will occur to persons skilled in the art.

What I claim is:

A barbecue grill comprising an upright standard having a tubular upper end with external supporting means spaced below said upper end, a relatively shallow circular bowl-like firepot having sides and having a top opening and having a central bearing hole through which the upper end of said standard detachably extends with the firepot rotatably supported on said external supporting means of the standard, a circular grid having a depending central post detachably supported in the tubular upper end of said standard so that the grid is maintained over said firepot, said grid having a circumferential rim with circumferentially spaced portions and having an inwardly extending servicing recess between said portions, the inner boundary of said recess being defined by a grid portion which extends part way to the center of the grid and which connects said circumferentially spaced portions of the rim, rotation of the firepot around its central axis being adapted to bring selected portions of the firepot into registration with said servicing recess to facilitate servicing, the diameter of said grid being such with respect to the diameter of the top opening of the firepot as to provide for access to the firepot through said servicing recess when the grid is in place and said recess being of sufficient size to permit the insertion of servicing tools for servicing selected portions of the firepot by effecting relative horizontal rotation between the firepot and grid.

References Cited in the file of this patent

UNITED STATES PATENTS

| | | | |
|---|---|---|---|
| 750,742 | Weston | Jan. 26, | 1904 |
| 1,530,815 | Dear | Mar. 24, | 1925 |
| 2,158,805 | Smith | May 16, | 1939 |
| 2,173,024 | Park | Sept. 12, | 1939 |
| 2,302,984 | Tollzien | Nov. 24, | 1942 |
| 2,325,828 | Betts | Aug. 3, | 1943 |
| 2,349,617 | Gorman | May 23, | 1944 |
| 2,482,068 | Larson | Sept. 13, | 1949 |
| 2,740,395 | Goodwin | Apr. 3, | 1956 |
| 2,797,681 | Crosley et al. | July 2, | 1957 |
| 2,816,538 | Miller et al. | Dec. 17, | 1957 |
| 2,819,667 | Victor | Jan. 14, | 1958 |
| 2,860,624 | Eddy | Nov. 18, | 1958 |
| 2,902,026 | Hathorn | Sept. 1, | 1959 |